(12) United States Patent
Blosser et al.

(10) Patent No.: US 9,051,063 B1
(45) Date of Patent: Jun. 9, 2015

(54) SPACE VEHICLE HEAT SHIELD HAVING EDGEWISE STRIPS OF ABLATIVE MATERIAL

(71) Applicant: The United States of America as represented by the Administrator of the National Aeronautics and Space Administration, Washington, DC (US)

(72) Inventors: Max L. Blosser, Newport News, VA (US); Carl C. Poteet, Yorktown, VA (US); Stan A. Bouslog, Friendswood, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 178 days.

(21) Appl. No.: 13/752,495

(22) Filed: Jan. 29, 2013

(51) Int. Cl.
*B64G 1/58* (2006.01)

(52) U.S. Cl.
CPC ........................ *B64G 1/58* (2013.01)

(58) Field of Classification Search
CPC .......................................................... B64G 1/58
USPC ................................... 244/121, 159.1, 171.7
See application file for complete search history.

(56) References Cited

U.S. PATENT DOCUMENTS 8,367,178 B1 * 2/2013 Rawal et al. ................... 428/47

OTHER PUBLICATIONS

Milos, F. S., et al., "Ablation and Thermal Response Property Model Validation for Phenolic Impregnated Carbon Ablator," Journal of Spacecraft and Rockets, Sep.-Oct. 2010, pp. 786-805, vol. 47, No. 5.
Tran, Huy K., et al., "Phenolic Impregnated Carbon Ablators (PICA) for Discovery Class Missions," AIAA Thermophysics Conference, AIAA Meeting Paper 96-1911, Jun. 17-20, 1996, pp. 1-13, New Orleans, LA.
Chen, Y. -K., et al., "Ablation and Thermal Response Program for Spacecraft Heatshield Analysis," Journal of Spacecraft and Rockets, May-Jun. 1999, pp. 475-483, vol. 36, No. 3.
Milos, F. S., et al., "Nonequilibrium Ablation of Phenolic Impregnated Carbon Ablator," Journal of Spacecraft and Rockets, Sep.-Oct. 2012, pp. 894-904, vol. 49, No. 5.
Lachaud, Jean, et al., "Multiscale Approach to Ablation Modeling of Phenolic Impregnated Carbon Ablators," Journal of Spacecraft and Rackets, Nov.-Dec. 2010, pp. 910-921, vol. 47, No. 6.
Chen; Y. -K., et al., "Two-Dimensional Implicit Thermal Response and Ablation Program for Charring Materials," Journal of Spacecraft and Rockets, Jul.-Aug. 2001, pp. 473-481, vol. 38, No. 4.

(Continued)

*Primary Examiner* — Nicholas McFall
(74) *Attorney, Agent, or Firm* — Andrea Z. Warmbier

(57) ABSTRACT

A heat shield for a space vehicle comprises a plurality of phenolic impregnated carbon ablator (PICA) blocks secured to a surface of the space vehicle and arranged in a pattern with gaps therebetween. The heat shield further comprises a plurality of PICA strips disposed in the gaps between the PICA blocks. The PICA strips are mounted edgewise, such that the structural orientation of the PICA strips is substantially perpendicular to the structural orientation of the PICA blocks.

20 Claims, 4 Drawing Sheets

(56) References Cited

OTHER PUBLICATIONS

Hong, Changqing, et al., "Novel Phenolic Impregnated 3-D Fine-woven Pierced Carbon Fabric Composities: Microstructure and Ablation Behavior," Composites: Part B, 2012, pp. 2389-2394, vol. 43.

Pulci, G., et al., "Carbon-phenolic Ablative Materials for Re-entry Space Vehicles: Manufacturing and Properties," Composites: Part A, 2010, pp. 1483-1490, vol. 41.

* cited by examiner

SPACE VEHICLE HEAT SHIELD HAVING EDGEWISE STRIPS OF ABLATIVE MATERIAL

STATEMENT REGARDING FEDERALLY SPONSORED RESEARCH OR DEVELOPMENT

The invention was made by employees of the United States Government and may be manufactured and used by or for the Government of the United States of America for governmental purposes without the payment of any royalties thereon or therefor.

FIELD OF THE INVENTION

The present invention relates generally to space vehicle heat shields for atmospheric entry, and, more particularly, relates to phenolic impregnated carbon ablator heat shields.

BRIEF SUMMARY OF THE INVENTION

In one embodiment of the invention, a space vehicle heat shield comprises a plurality of phenolic impregnated carbon ablator (PICA) blocks secured to a surface of a space vehicle and arranged in a pattern with gaps therebetween and a plurality of PICA strips disposed in the gaps. The PICA blocks have a structural orientation and are arranged such that the structural orientation of the PICA blocks is substantially parallel to the surface of the space vehicle. The PICA strips have a structural orientation and are arranged such that the structural orientation of the PICA strips is substantially perpendicular to the structural orientation of the PICA blocks.

An edge of each PICA strip adjacent to the space vehicle may be either: (1) not bonded to the surface of the space vehicle; (2) bonded to a fibrous strain isolation pad situated between the PICA strip and the surface of the space vehicle; or (3) bonded directly to the surface of the space vehicle.

The sides of each PICA strip adjacent to a PICA block may be not bonded to the adjacent PICA block. Alternatively, one or both opposing sides of each PICA strip may be bonded to at least one adjacent PICA block.

The opposing sides of each PICA block and the opposing sides of each PICA strip may be substantially parallel. Alternatively, the opposing sides of each PICA strip may be tapered inward toward the surface of the space vehicle.

Each PICA strip may comprise a structural member bonded to an edge of the PICA strip opposite the space vehicle, and the height of each PICA strip may be selected such that the edge of the PICA strip opposite the space vehicle and the structural member extend further from the space vehicle than the PICA blocks when the PICA strips are disposed in the gaps.

Each PICA strip may be preconditioned prior to being disposed in the gaps by subjecting each PICA strip to a through-thickness compressive load cycle.

In addition to the heat shield, as described above, other aspects of the present invention are directed to corresponding methods for providing heat shielding on a space vehicle.

In yet another embodiment of the present invention, a method is disclosed for providing heat shielding on a space vehicle. The method comprises securing a plurality of phenolic impregnated carbon ablator (PICA) blocks to a surface of a space vehicle. The PICA blocks are arranged in a pattern with gaps therebetween. The PICA blocks have a structural orientation and are arranged such that the structural orientation of the PICA blocks is substantially parallel to the surface of the space vehicle. The method also includes disposing a plurality of PICA strips in the gaps. The PICA strips have a structural orientation and are arranged such that the structural orientation of the PICA strips is substantially perpendicular to the structural orientation of the PICA blocks.

These and other features, advantages, and objects of the present invention will be further understood and appreciated by those skilled in the art by reference to the following specification, claims, and appended drawings.

DETAILED DESCRIPTION OF THE INVENTION

The current invention provides a means to eliminate gaps between PICA blocks by filling the gaps with a compatible, relatively soft material that alleviates the mechanical stresses that would occur in rigidly bonded PICA blocks. A suitable gap material should have comparable thermal and ablative performance to PICA and have low enough porosity to prevent hot gas flow in the gap. It must be compliant enough that adjacent PICA blocks can move somewhat independently of each other and the underlying carrier structure to reduce thermal and mechanical stresses to acceptable levels.

Figure 1:
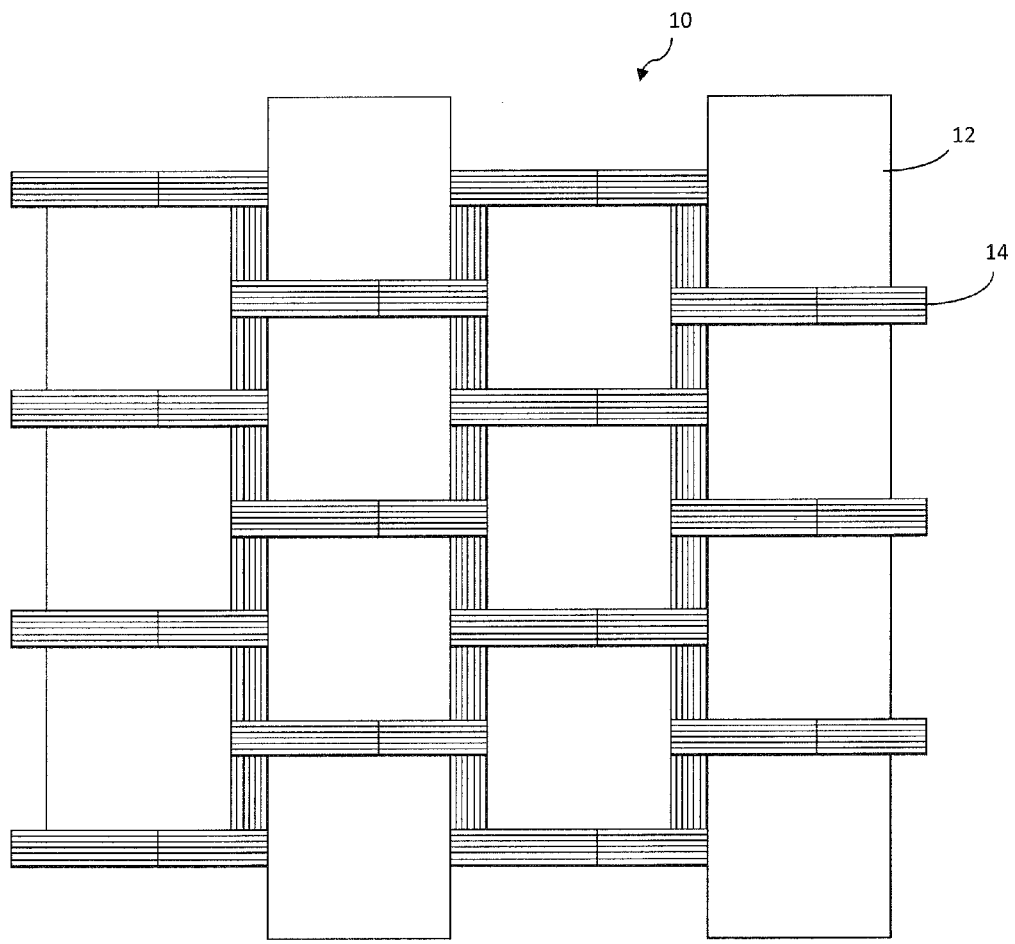
FIG. 1 is a plan view of a portion of a space vehicle heat shield, in accordance with embodiments of the present invention.

One embodiment of the present invention (which is referred to herein as "PICA-on-edge") uses strips of preconditioned PICA in an edgewise orientation to fill gaps between adjacent PICA blocks, yet allows the blocks to be structurally uncoupled. The preconditioning of PICA and the resulting structural properties are described below. Preconditioning refers to the process of subjecting the PICA material to the initial 25% strain through-thickness compressive load cycle that results in a softened material. A portion of a heat shield 10 for a space vehicle in accordance with embodiments of the present invention is illustrated in FIG. 1. The heat shield comprises a plurality of phenolic impregnated carbon ablator (PICA) blocks 12 secured to a surface of a space vehicle and arranged in a pattern with gaps therebetween. Any number of different patterns may be used, such as the "T-joint" pattern of FIG. 1 (such a pattern performed well in a bending test). The PICA blocks have a structural orientation, as described above in the Background section, and arranged on the space vehicle such that the structural orientation of the PICA blocks is substantially parallel to the surface of the space vehicle. The heat shield 10 further comprises a plurality of PICA strips 14 disposed in the gaps between the PICA blocks. The PICA strips have a structural orientation and are arranged such that the structural orientation of the PICA strips is substantially perpendicular to the structural orientation of the PICA blocks. In other words, the PICA blocks and PICA strips have the same structure (albeit with different shapes and sizes) and structural orientation, but are mounted at different orientations to the space vehicle. This different mounting orientation is more clearly illustrated in FIGS. 2-6.

Predicted behavior of a PICA-on-Edge joint is compared to acreage PICA (i.e., the PICA blocks as described in the Background section) and other joint options. A number of attachment and installation options are described herein. An alternate, tapered joint configuration is described herein. Also, an approach for verifying the attachment of a PICA-on-edge segment is described herein.

During through-thickness compression testing, PICA was found to spring back after large compressive strains with little visible damage. A typical stress-strain curve for PICA shows nonlinear behavior, a large amount of hysteresis, and a very soft unloading curve. Additional through-thickness cyclic compression tests were performed on two PICA specimens to determine whether the initial compression cycle affected the structural properties. The specimens were subjected to an initial compression cycle to 25% strain and four subsequent compression cycles to 15% strain. The first compression cycle was consistent with results from other tests. Cycles 2 through 4 exhibited repeatable, much softer behavior than the first cycle. The initial stiffness dropped more than an order of magnitude from 3800 psi to 268 psi. These results indicate that edgewise PICA is an excellent candidate for use as a gap filler because it has repeatable soft behavior over a large strain range.

The two compressively cycled PICA specimens were then tested in tension to see if the through-thickness tensile properties had changed. The through-thickness tensile modulus is reduced from 5000 psi to approximately 100 psi. The strain to failure is increased from 0.6% to approximately 6%. Subsequent bending tests of arrays of PICA blocks with PICA-on-Edge gap fillers have demonstrated that the gap fillers fail in tension between 4 and 6 percent strain. These results indicate that preconditioned PICA has soft behavior and a useful strain range in tension also.

A finite element analysis was performed to see how well a PICA-on-Edge joint would be predicted to perform its intended function. An existing, three-dimensional finite element model of a flexural test specimen was modified to incorporate a two-inch-wide PICA-on-Edge joint. The model was loaded to 10,000 lbs and results were compared to a specimen with no joint, with a 0.08 inch room temperature vulcanizing (RTV)-filled joint, and with a 0.08 inch open gap. The specimen with the RTV-filled joint has similar stress levels and distributions as the specimen with no joint. The RTV structurally couples the adjacent blocks together. The strains in the longitudinal direction for the same four configurations further confirm that the RTV-filled joint structurally couples adjacent PICA blocks and the PICA-on-Edge joint structurally decouples adjacent blocks. In addition, the open gap was predicted to open more that 0.1 inches, which would be very difficult to accommodate by any thin gap filler.

Figure 2:
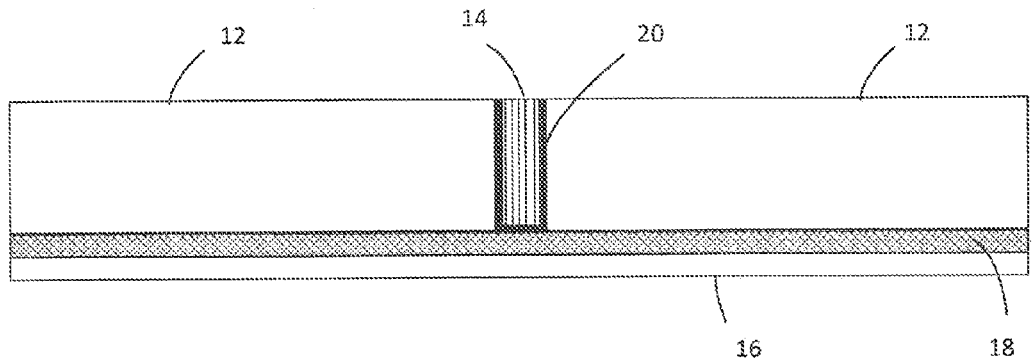
FIG. 2 is a cross-sectional view of a portion of a space vehicle heat shield, in accordance with embodiments of the present invention.
Figure 3:
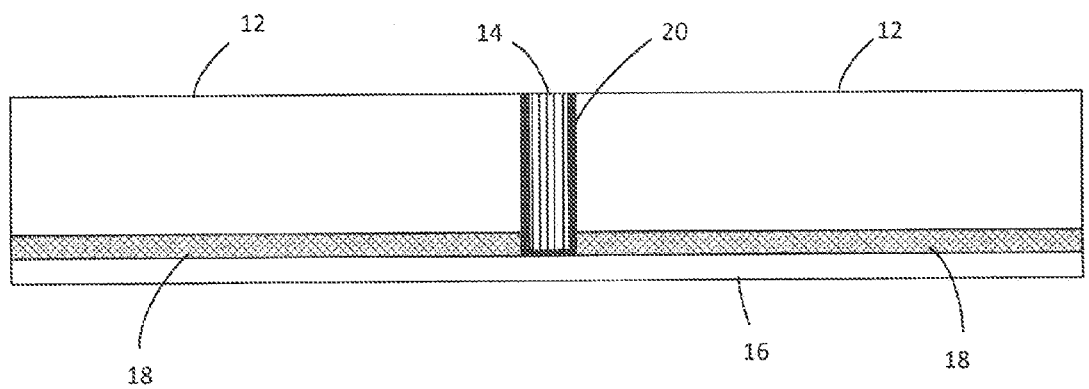
FIG. 3 is a cross-sectional view of a portion of a space vehicle heat shield, in accordance with alternative embodiments of the present invention.
Figure 4:
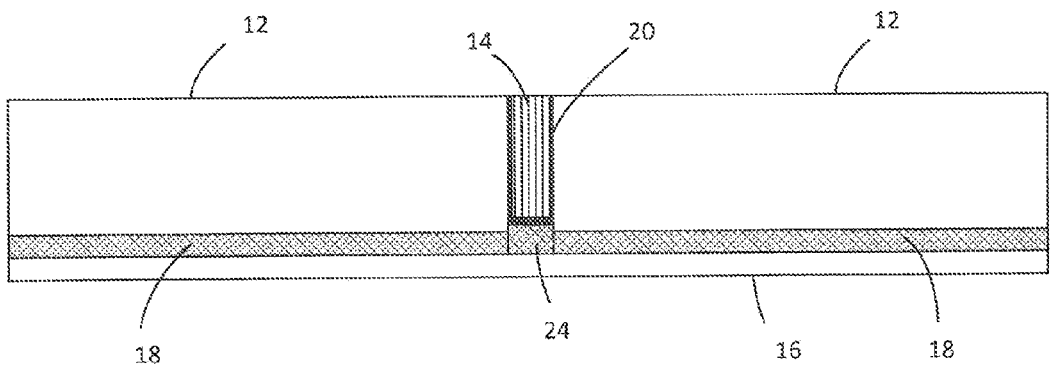
FIG. 4 is a cross-sectional view of a portion of a space vehicle heat shield, in accordance with alternative embodiments of the present invention.

FIGS. 2-4 are cross-sectional views of a portion of a space vehicle heat shield, in accordance with alternative embodiments of the present invention. Referring now to FIG. 2, the illustrated portion of the heat shield comprises two PICA blocks 12 and a PICA strip 14 in the gap between the PICA blocks. The PICA blocks and PICA strip are mounted on a surface 16 of the space vehicle. A strain isolation pad (SIP) 18 is sandwiched between each PICA block and the space vehicle surface.

A number of attachment options are possible for the edgewise PICA strips. The edge of the PICA strip adjacent to the structure of the space vehicle can be unbonded, bonded to a fibrous SIP, or directly bonded to the structure. In FIG. 2, the SIP 18 runs contiguously under the PICA blocks and PICA strip, and the PICA strip is bonded on its bottom to the SIP and on its sides to the PICA blocks by means of an RTV adhesive 20. This embodiment works structurally and eliminates gaps that can cause problems with hot gas flow. In FIG. 3, the PICA strip is bonded directly to the surface of the space vehicle by means of the room temperature vulcanizing adhesive 20. In FIG. 4, a separate, thicker SIP 24 is sandwiched between the PICA strip and the space vehicle surface and the PICA strip is bonded to the thicker SIP by means of the RTV adhesive 20. The option of having the PICA strip not bonded to the surface is not illustrated.

The sides of each PICA strip (i.e., the portion of the strip adjacent to and abutting one or more PICA blocks) can be unbonded, partially bonded (i.e., bonded over just a portion of one of the surfaces to the adjacent block(s)), or fully bonded to one or both adjacent blocks (i.e., bonded to the adjacent block(s) over every part of a surface). Full side bonding is illustrated in FIGS. 2-4. If the strips are installed in segments, the ends of the segments can be bonded or unbonded. In embodiments of the invention in which the edgewise strips of PICA are firmly bonded to the adjacent blocks, it is then possible to machine the assembled heat shield to the desired final thickness profile and required smoothness. Advantageously, this avoids having to tailor individual block thicknesses and limit steps between adjacent blocks. Therefore, the unique part count can be greatly reduced and assembly of the heat shield significantly simplified.

Figure 5:
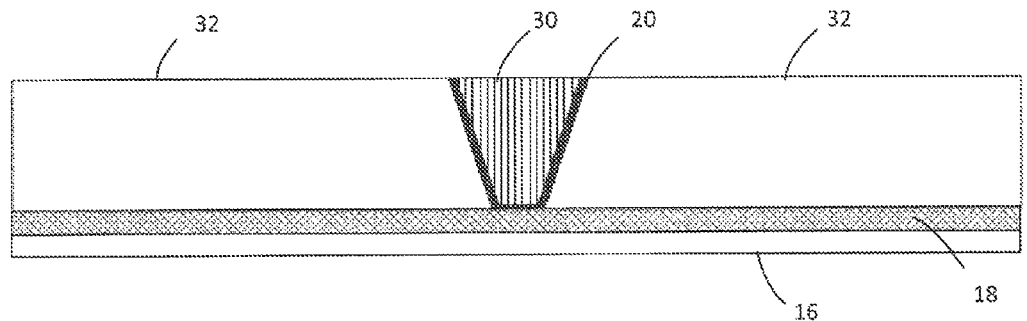
FIG. 5 is a cross-sectional view of a portion of a space vehicle heat shield, in accordance with alternative embodiments of the present invention.
Figure 6:
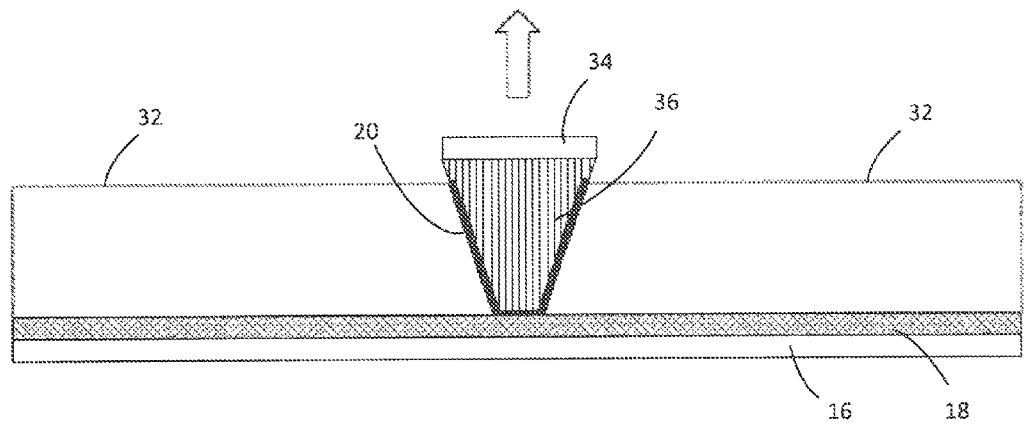
FIG. 6 is a cross-sectional view of a portion of a space vehicle heat shield, in accordance with alternative embodiments of the present invention.

The edgewise PICA strips can have opposing sides that are substantially parallel to each other (i.e., substantially perpendicular to the underlying structure), as illustrated in FIGS. 2-4. In such embodiments, the abutting sides of the PICA blocks will also be substantially perpendicular to the underlying structure. In alternative embodiments, as illustrated in FIGS. 5-6, the opposing sides of the PICA strips can be tapered inward (when going from the outer edge to the inner edge). In such embodiments, the abutting edges of the PICA blocks will also be correspondingly tapered as illustrated in FIGS. 5-6. Referring now to FIG. 5, the illustrated portion of the heat shield comprises two PICA blocks 32 with tapered edges and a PICA strip 30 with correspondingly tapered sides in the gap between the PICA blocks. While FIGS. 5-6 show gaps between the PICA strip and the PICA blocks, this is for clarity of the illustrations. In actual implementations of the heat shield, the PICA strip will fit snugly within the gaps between the PICA blocks such that the PICA strip is in contact the PICA blocks.

There are a number of advantages to tapering the sides of the edgewise PICA strip so that the strip is wider at the outer PICA surface than it is next to the structure. The gap motion between PICA blocks is largest near the outer surface and least next to the structure, so that a greater width of edgewise PICA is needed at the outer surface to accommodate the gap motion yet remain within acceptable strain limits. Also, because edgewise PICA has a higher thermal conductivity, tapering the edgewise PICA (as opposed to running the full width strip all the way to the structure) will reduce the amount of extra heat conducted to the structure. In addition, even with imperfect bonding, the tapered shape provides a mechanical interlock between adjacent blocks. Another potential advantage of the tapered shape is that some degree of precompression could be accomplished by pressing slightly oversized tapered strips into a corresponding tapered gap between blocks.

Attachment of the edgewise PICA segments can be verified by the approach illustrated in FIG. 6. The PICA strips 36 can be made taller than required to fill the gaps between blocks. A structural material 34 (e.g., aluminum) can be bonded to the outer surface to enable the application of a mechanical load for bond verification. After the PICA strip is bonded in place and the bond is cured, a mechanical load is applied (in the direction of the arrow in FIG. 6) to verify the bond. The excess height of the segment can then be cut off and the surface machined smooth such that the strip is now even with the blocks.

Figure 7:
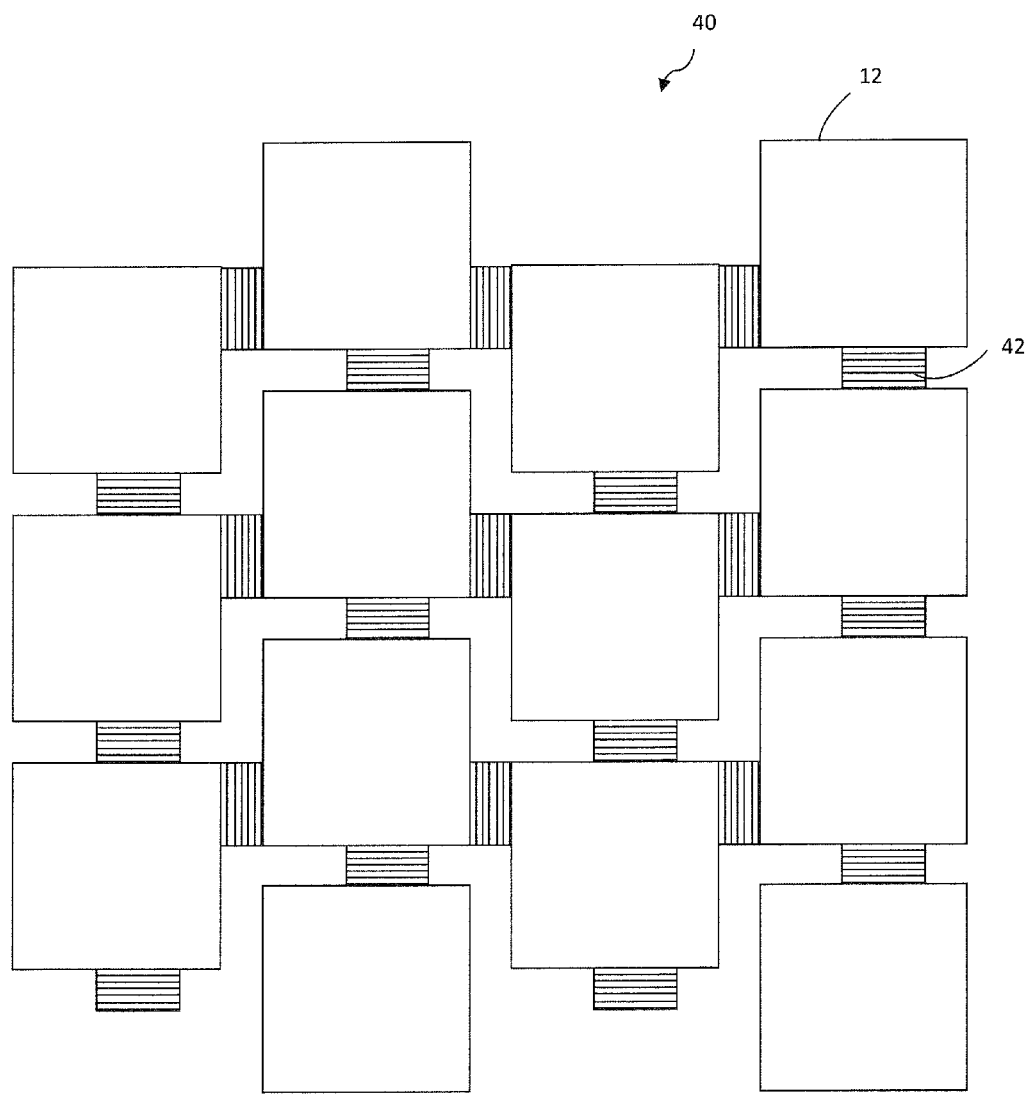
FIG. 7 is a plan view of a portion of a space vehicle heat shield, in accordance with alternative embodiments of the present invention.

FIG. 7 illustrates an alternative method for installing PICA-on-Edge joints. A portion of a heat shield 10 for a space vehicle in accordance with embodiments of the present invention is illustrated in FIG. 7. As in FIG. 1, the heat shield portion of FIG. 7 comprises a plurality of PICA blocks 12 secured to a surface of a space vehicle and arranged in a grid pattern with appropriately sized, tapered gaps between them (the tapering is not illustrated in FIG. 7). Short, tapered edgewise PICA segments 42 are bonded in place (the bottom of the strips are bonded to the surface and the sides of the strips are bonded to the corresponding blocks) at key locations so that all of the PICA blocks are locked into their correct positions. Then additional edgewise PICA segments (not illustrated in FIG. 7) are used to fill in the remaining open gaps.

PICA-on-Edges offer several unique features and advantages over other candidate gap fillers for a PICA heat shield:

Preconditioning PICA in the through-thickness direction produces a greatly softened material with repeatable behavior over a large strain range. This phenomenon was previously unknown.

2) PICA-on-Edge uses the same material as the ablator blocks. Competing concepts use RTV or fibrous ceramic materials.
3) PICA-on-Edge joints can be made much wider than competing concepts and can therefore accommodate much larger joint motions.
4) PICA-on-Edge can eliminate gaps between adjacent PICA blocks while allowing the blocks to remain structurally decoupled. Competing concepts either structurally couple adjacent blocks or allow gaps to open up between blocks when the underlying structure deforms.
5) PICA-on-Edge can provide a verified bond between PICA blocks that provides a secondary attachment that can prevent a PICA block from detaching from the heat shield even if its primary bond to the structure fails. Other gap fillers either provide no secondary attachment or their secondary attachment cannot be verified.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A space vehicle heat shield comprising:
   a plurality of phenolic impregnated carbon ablator (PICA) blocks secured to a surface of a space vehicle and arranged in a pattern with gaps therebetween, the PICA blocks having a structural orientation and being arranged such that the structural orientation of the PICA blocks is substantially parallel to the surface of the space vehicle; and
   a plurality of PICA strips disposed in the gaps, the PICA strips having a structural orientation and being arranged such that the structural orientation of the PICA strips is substantially perpendicular to the structural orientation of the PICA blocks.

2. The heat shield of claim 1, wherein an edge of each PICA strip adjacent to the space vehicle is not bonded to the surface of the space vehicle.

3. The heat shield of claim 1, wherein an edge of each PICA strip adjacent to the space vehicle is bonded to a fibrous strain isolation pad situated between the PICA strip and the surface of the space vehicle.

4. The heat shield of claim 1, wherein an edge of each PICA strip adjacent to the space vehicle is bonded directly to the surface of the space vehicle.

5. The heat shield of claim 1, wherein a side of each PICA strip adjacent to a PICA block is not bonded to the adjacent PICA block.

6. The heat shield of claim 1, wherein each PICA strip has opposing sides, each opposing side being adjacent to at least one PICA block, and wherein one side of each PICA strip is bonded to at least one adjacent PICA block.

7. The heat shield of claim 6, wherein both sides of each PICA strip are bonded to at least one adjacent PICA block.

8. The heat shield of claim 1, wherein each PICA strip has opposing sides, each opposing side being adjacent to at least one PICA block, and wherein the opposing sides of each PICA strip are substantially parallel.

9. The heat shield of claim 1, wherein each PICA strip has opposing sides, each opposing side adjacent to at least one PICA block, and wherein the opposing sides of each PICA strip are tapered inward toward the surface of the space vehicle.

10. The heat shield of claim 9, wherein each PICA strip comprises a structural member bonded to an edge of the PICA strip opposite the space vehicle, and wherein a height of each PICA strip is selected such that the edge of the PICA strip opposite the space vehicle and the structural member extend further from the space vehicle than the PICA blocks when the PICA strips are disposed in the gaps.

11. The heat shield of claim 1, wherein each PICA strip is preconditioned prior to being disposed in the gaps by subjecting each PICA strip to a through-thickness compressive load cycle.

12. A method for providing heat shielding on a space vehicle, the method comprising:

securing a plurality of phenolic impregnated carbon ablator (PICA) blocks to a surface of a space vehicle, the PICA blocks being arranged in a pattern with gaps therebetween, the PICA blocks having a structural orientation and being arranged such that the structural orientation of the PICA blocks is substantially parallel to the surface of the space vehicle; and disposing a plurality of PICA strips in the gaps, the PICA strips having a structural orientation and being arranged such that the structural orientation of the PICA strips is substantially perpendicular to the structural orientation of the PICA blocks.

13. The method of claim 12, wherein an edge of each PICA strip adjacent to the space vehicle is not bonded to the surface of the space vehicle.

14. The method of claim 12, further comprising:
bonding an edge of each PICA strip adjacent to the space vehicle to a fibrous strain isolation pad situated between the PICA strip and the surface of the space vehicle.

15. The method of claim 12, further comprising:
bonding an edge of each PICA strip adjacent to the space vehicle directly to the surface of the space vehicle.

16. The method of claim 12, wherein a side of each PICA strip adjacent to a PICA block is not bonded to the adjacent PICA block.

17. The method of claim 12, wherein each PICA strip has opposing sides, each opposing side being adjacent to at least one PICA block, and wherein the method further comprises bonding at least one side of each PICA strip to at least one adjacent PICA block.

18. The method of claim 12, wherein each PICA strip has opposing sides, each opposing side being adjacent to at least one PICA block, and wherein the opposing sides of each PICA strip are substantially parallel.

19. The method of claim 12,
wherein each PICA strip has opposing sides, each opposing side adjacent to at least one PICA block, and wherein the opposing sides of each PICA strip are tapered inward toward the surface of the space vehicle; and
wherein each PICA strip comprises a structural member bonded to an edge of the PICA strip opposite the space vehicle, and wherein a height of each PICA strip is selected such that the edge of the PICA strip opposite the space vehicle and the structural member extend further from the space vehicle than the PICA blocks when the PICA strips are disposed in the gaps.

20. The method of claim 19, further comprising:
bonding the opposing sides of each PICA strip to the adjacent PICA blocks;
applying a mechanical load to the structural member of each PICA strip to verify the bonding; and
removing the structural members and a portion of each PICA strip that extends further from the space vehicle than the PICA blocks.

* * * * *